Nov. 16, 1926.
F. KLASSKIN ET AL
1,607,087
ELECTRICALLY HEATED TRAY
Filed Dec. 21, 1925
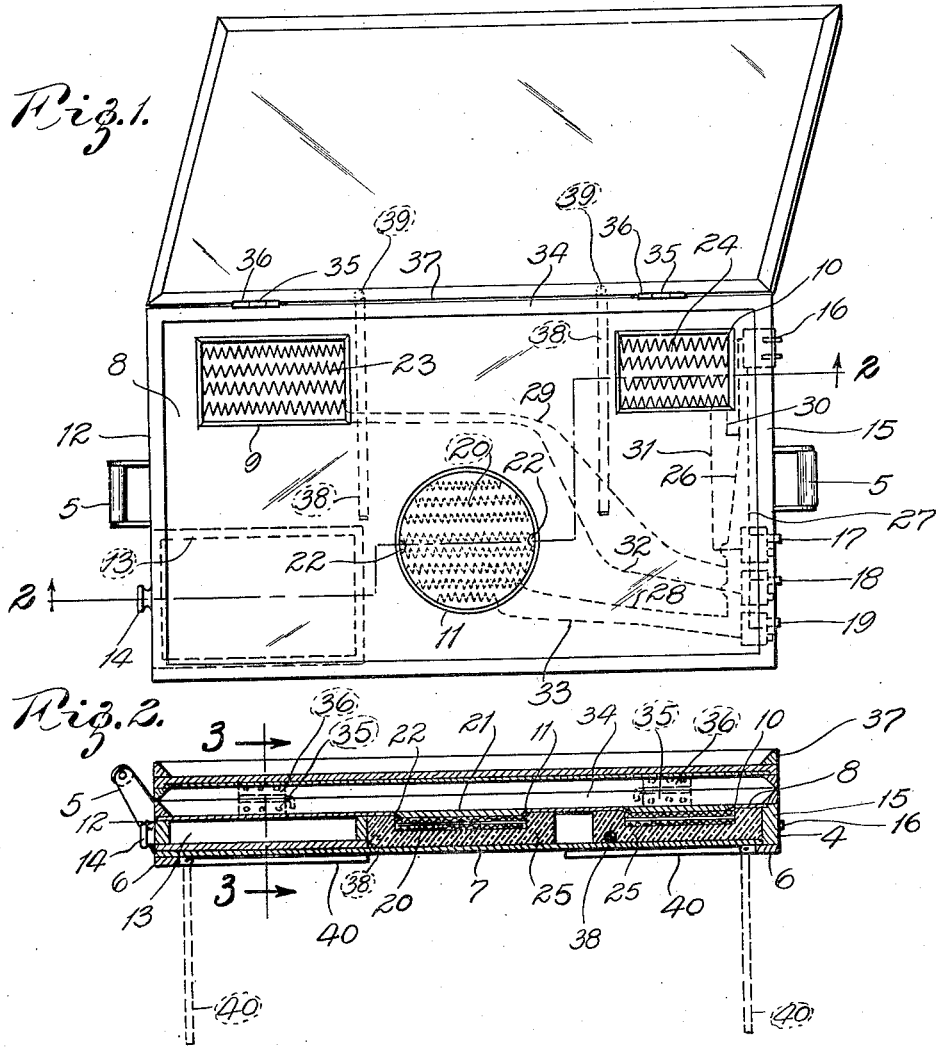
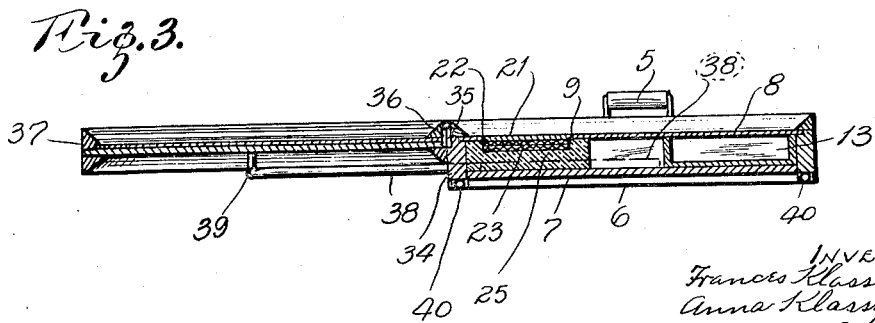

Patented Nov. 16, 1926.

1,607,087

UNITED STATES PATENT OFFICE.

FRANCES KLASSKIN AND ANNA KLASSKIN, OF ST. LOUIS, MISSOURI, ASSIGNORS OF ONE-THIRD TO MARIE KLASSKIN, OF ST. LOUIS, MISSOURI.

ELECTRICALLY-HEATED TRAY.

Application filed December 21, 1925. Serial No. 76,598.

Our invention relates to improvements in electrically heated trays, and has for its primary object a tray designed for use in hospitals, which is provided with a plurality of electrical heating units so that food can be served and maintained warm regardless of the length of time the patient takes for consuming the meal.

A further object is to provide a tray which contains a plurality of heating units by means of which it is possible to preserve food stuffs at a proper temperature for consumption and on which it is also possible to make toast so that the same can be served hot.

A still further object is to construct a tray which is composed of two sections, one section containing electric heating units so that food stuffs can be served and maintained at a relatively high degree of temperature, the other section adapted to fold over the electrically heated section so that the device can be used as an ordinary serving tray.

A still further object is to construct an electrically heated tray which is composed of two sections hingedly connected together so that one portion of the tray may be used to prepare hot luncheons and the other part or portion to serve as a table when opened out so that several persons can have food served on the same tray.

In the drawings:

Fig. 1 is a top plan view of our device with the upper portion or section opened up showing the electric heating devices and their connections;

Fig. 2 is a sectional view taken on the line 2—2 of Fig. 1; and

Fig. 3 is a cross section taken on the line 3—3 of Fig. 2 showing the upper section in extended form and the manner of supporting the same.

In the construction of our device we employ a tray having a frame 4 to the ends of which handles 5 are attached. The frame 4 is provided on its bottom with a cleat or rim 6 which supports a base 7. This base is preferably formed of metal although other material may be used. Supported by the frame 4 and spaced apart from the bottom 7 is a top 8 which is provided with openings 9, 10 and 11. The end 12 of the frame is provided with an opening for the insertion of a drawer 13. This drawer is provided with a knob or pull 14 and is designed to contain the necessary silverware and napkins. The wall 15 is provided with a socket 16 for an electric connection to any suitable source of electric energy and with switches 17, 18 and 19, which lead to the various heating units.

Positioned below the opening 11 is a heating unit 20, which is of ordinary construction or, in other words, composed of a plurality of conductors which resist the passage of electricity and become heated thereby. The opening which surrounds this heating unit is preferably circular and is designed to have a plate placed over the same so that the plate can be heated and prevent any food stuffs thereon from becoming chilled.

The opening 9 is preferably rectangular and is designed to have a coffee pot and other articles which hold food stuffs in bulk placed thereover so as to maintain the temperature of the same, while the opening 10, which is also rectangular, is provided with a plurality of cross bars so that it can serve a dual purpose, both as a toaster and also as a heater for other food stuffs. The edges of the openings 9, 10 and 11 are preferably tapered so as to receive plates 21, which plates are preferably provided with notches 22 so that the fingers can be used to disengage the same and permit their ready removal. When these plates are in position, the plate 8 presents substantially an unbroken surface and can be used as a serving tray without the use of the other section as will be explained in detail later.

Positioned beneath the opening 9 is a heating unit 23 and beneath the opening 10 a heating unit 24. These units are constructed similar to the unit 20 and are each surrounded by heat insulating material such as asbestos or the like as indicated by the numeral 25.

As will be noted from Fig. 1 the electric socket 16 has connected thereto conductors 26 and 27. The conductor 27 is connected to each of the switches 17, 18 and 19, while the conductor 26 is connected to the heating units 20, 21 and 23 by means of conductors 28, 29 and 30 respectively. Extending from the switch 17 is a conductor 31 by means of which the electric circuit is completed through the unit 24. From the switch 18 extends a conductor 32 by means of which the circuit is completed through the heating unit 23 and from the switch 19 is a conductor 33, which leads to the heating unit 20. By this connection only one power wire is needed, while either or all of the heating units can be energized as desired, so that in the event it is desired to use only one or two of the heating units, the other need not be operated.

Secured to the side 34 of the tray are hinged sections 35 which are detachably secured to hinged sections 36 secured to the section 37. The detachable connection is made by means of removable hinge pins so that, in the event it is desired to disconnect the section 37 entirely, these pins are withdrawn and the section removed.

Slidably mounted in the frame 4 are rods 38 which have upturned ends 39. These rods are designed to be pulled outwardly as illustrated in Fig. 3 and have their upturned ends 39 support the section 37 so that a tray of double width can be obtained. This is especially desirable where several persons are being served from the same tray or where an elaborate luncheon is being served on one tray as it permits articles, such as ice cream, puddings and the like, which are to be served cold, to be removed from proximity to the heating units.

The tray is also provided with folding legs 40. These legs are adapted to rest on the side rails of the bed when our device is used in hospitals and support the tray above the body of the patient thus eliminating the use of the ordinary bed table now employed. In fact with our double tray it is also possible to use the same as a table because when the section 37 is folded over and the tray supported on the legs 40, the patient can use the same as an ordinary table for reading or writing, or even for playing games. An essential feature of our device is that only one source of electric energy is necessary to energize the various heating units of our device. The necessary table linen and silver is contained in the drawer thus permitting replenishment of the same at any time. This latter feature makes our device especially useful for hospitals because the various table utensils and napkins can be placed in the drawer immediately after they have been cleansed thus eliminating the necessity of gathering the various articles together at the time the food is to be served. Furthermore the drawers can be filled as each article is cleansed, thus eliminating the necessity of frequent handling and reducing considerably the time necessary to fill a tray at the time of serving meals.

Besides the advantage of our tray for hospital use, it also has a distinct advantage in serving meals for persons in bed as a meal can be prepared in the kitchen, brought up on the tray, the electric connection made, and the meal kept hot regardless of the length of time between the actual serving and the consumption of the food. This feature is impossible in ordinary trays. Furthermore with a tray of our construction light hot luncheon can be prepared on the same, or, if desired, our device may be used as an ordinary serving tray.

Having fully described our invention, what we claim is:

1. An electrically heated tray, comprising a frame, an inwardly extending rim secured to the bottom of said frame, a base supported on said rim within said frame, a top having openings therein carried by said frame and spaced apart from the bottom, electric heating units located beneath each of said openings, heat insulating material encasing said heating units on their sides and bottom, means for supplying electric current to said heating units, means for making and breaking the supply of electric circuit to each of said units separate, a drawer slidably mounted in one side of said frame and between the base and top, and folding legs pivotally attached to the under side of said frame.

2. An electrically heated tray, comprising a frame having an inwardly extending rim around its bottom, a base supported on said rim within the frame, a top provided with openings carried by said frame and spaced above the bottom, electric heating units located beneath the said openings, said units being encased on their sides and bottom with insulating material, means for the attachment of an electric conductor for supplying electric current to said heating units, a separate switch for each of said heating units, a drawer slidably mounted in said frame and between the base and top, folding legs pivotally attached to the under side of said frame, and a separate closure removably located in each of the openings in said top.

3. An electrically heated tray, comprising a frame having a base carried thereby, a top provided with openings carried by said frame and spaced apart from the bottom, electric heating units located beneath each of said openings, said units being surrounded on their sides and bottom with heat insulating material, means for supplying electric current to said heating units, a second tray hingedly and detachably secured to the first mentioned tray, whereby said second mentioned tray may be folded over and cover the first mentioned tray or extended therefrom, and means carried by said frame for supporting the second mentioned tray when in extended position.

4. An electrically heated tray, comprising a frame provided with an inwardly extending rim on its bottom, a base supported on said rim within said frame, a top having openings therethrough carried by said frame and spaced above the bottom, electric heating units located beneath said openings, said units being encased on their sides and bottom with heat insulating material, switch-controlled means for supplying electric current to each of said heating units, a single means for supplying electric current to the switches, a removable closure for each of the openings in said top, a second tray hingedly and detachably secured to the first mentioned tray, whereby said second mentioned tray may be folded over the first mentioned tray or extended therefrom, supports slidably carried by the frame for supporting the second mentioned tray when in extended position, and handles secured to opposite ends of the frame whereby the said tray can be readily transported.

In testimony whereof we have affixed our signatures.

FRANCES KLASSKIN.
ANNA KLASSKIN.